US010855583B2

(12) United States Patent
Raj et al.

(10) Patent No.: US 10,855,583 B2
(45) Date of Patent: Dec. 1, 2020

(54) SUPPORTING BFD PACKETS IN A VIRTUALIZED SWITCH ENVIRONMENT

(71) Applicant: Hewlett Packard Enterprise Development LP, Houston, TX (US)

(72) Inventors: Anil Raj, Bangalore (IN); Anoop Govindan Nair, Bangalore (IN); Venkatavaradhan Devarajan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/201,319

(22) Filed: Nov. 27, 2018

(65) Prior Publication Data

US 2020/0044965 A1 Feb. 6, 2020

(30) Foreign Application Priority Data

Jul. 31, 2018 (IN) .............................. 201841028835

(51) Int. Cl.
  *H04W 56/00* (2009.01)
  *H04L 12/713* (2013.01)
  *H04L 12/709* (2013.01)
  *H04L 12/721* (2013.01)
  *H04L 12/733* (2013.01)

(52) U.S. Cl.
  CPC ............ *H04L 45/586* (2013.01); *H04L 45/20* (2013.01); *H04L 45/245* (2013.01); *H04L 45/66* (2013.01)

(58) Field of Classification Search
  CPC ..... H04L 45/568; H04L 45/20; H04L 45/245; H04L 45/66

USPC ......................................................... 370/254
See application file for complete search history.

(56) References Cited

U.S. PATENT DOCUMENTS

| 7,561,527 | B1 | 7/2009 | Katz et al. |
| 2007/0180104 | A1 | 8/2007 | Filsfils et al. |
| 2009/0323520 | A1 | 12/2009 | Kapoor et al. |
| 2010/0014527 | A1* | 1/2010 | Sakauchi ............... H04L 12/42 370/400 |

(Continued)

FOREIGN PATENT DOCUMENTS

CN 101252528 4/2011

OTHER PUBLICATIONS

Abernathy, D.W., Check Point R80.20 Production and Public EA, (Research Paper), Apr. 26, 2018, 14 Pgs.

(Continued)

*Primary Examiner* — Sai Ming Chan
(74) *Attorney, Agent, or Firm* — Hewlett Packard Enterprise Patent Department

(57) ABSTRACT

Examples disclosed herein relate to a method comprising receiving, at a first switch, a bidirectional forwarding detection packet, wherein the first switch and a second switch are part of a virtualized switch and each switch in the virtualized switch has a same Media Access Control (MAC) address, determining, at the first switch, that a destination MAC address included in the bidirectional forwarding detection packet is not owned by the first switch, determining, at the first switch, that the destination MAC address is owned by the second switch and bridging, from the first switch, the bidirectional forwarding detection packet to the second switch that owns the MAC address.

14 Claims, 6 Drawing Sheets

(56) References Cited

U.S. PATENT DOCUMENTS

2014/0204760 A1* 7/2014 Durrani .................. H04L 47/41
                                                            370/236
2016/0211989 A1* 7/2016 Jain .................... H04L 12/4633
2018/0365121 A1* 12/2018 Harneja ................ H04L 41/145

OTHER PUBLICATIONS

Katz et al., "Bidirectional Forwarding Detection (BED)", RFC 5880, Internet Engineering Task Force (IETF), Juniper Networks, Jun. 2010, pp. 1-49.

* cited by examiner

SUPPORTING BFD PACKETS IN A VIRTUALIZED SWITCH ENVIRONMENT

BACKGROUND

Link aggregation (LAG) is point-to-point link between a pair of network devices. Traffic may get load balanced among interfaces of the LAG, in order to help increase the aggregate bandwidth and improve link failure recovery.

BRIEF DESCRIPTION OF THE DRAWINGS

Some implementations of the present disclosure are described with respect to the following figures.

Figure 1A:
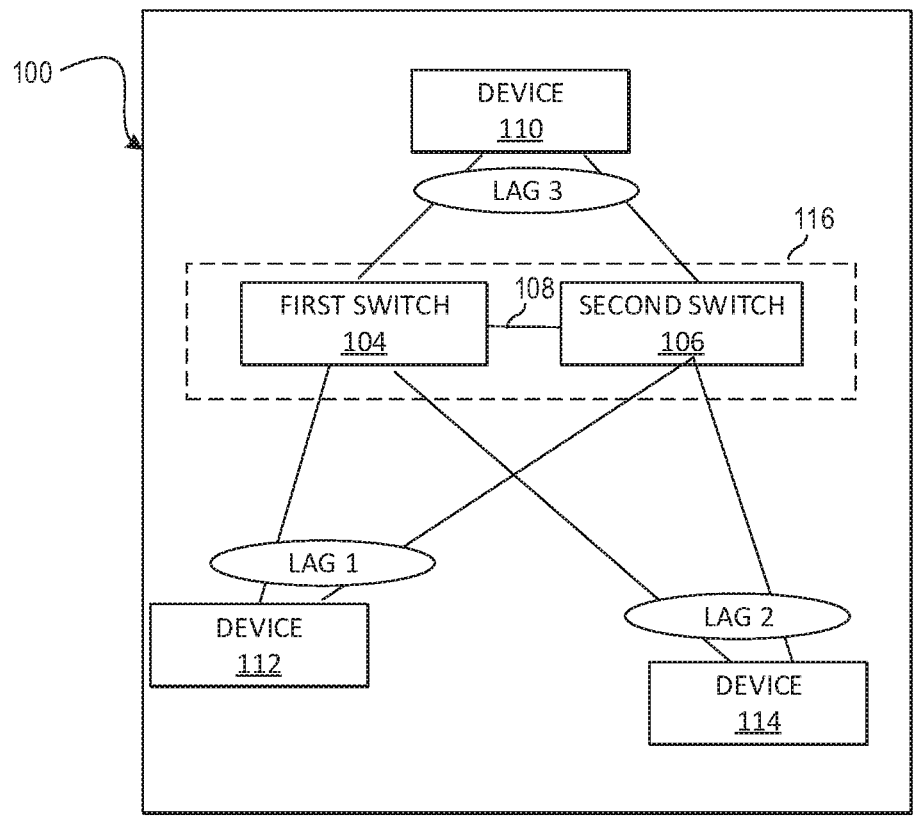
FIG. 1A is a block diagram of an example system for supporting BFD packets in a virtualized switch environment.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

While LAGs offer link level redundancy between network devices, there may not be node level redundancy. Node level redundancy may refer to a situation where if one of the nodes in the network layer goes down, there is another device that takes over the functionality at that layer. LAGs typically are point-to-point between a pair of nodes in the network and so offer link redundancy between the pair of nodes but with MCLAGs, a lag spans 2 nodes on one side and 1 or 2 nodes on the other side and so can offer both link level and node level redundancy. One way to achieve node level redundancy may be by using a STP (Spanning Tree Protocol). However, using a STP may cause alternate links to be blocked and thus there may be no load balancing or bandwidth gain and the typical re-convergence time when a node fails may be unacceptably long. Multi Chassis LAG (MCLAG) attempts to bridge this gap by providing node level redundancy while still retaining the classical benefits of LAG like load balancing, increased aggregate bandwidth and sub-second failure recovery. However, MCLAG may introduce a variety of problems of its own.

A method for supporting BFD packets in a virtualized switch environment may include receiving, at a first switch, a bidirectional forwarding detection packet, wherein the first switch and a second switch are part of a virtualized switch and each switch in the virtualized switch has a same Media Access Control (MAC) address, determining, at the first switch, that a destination MAC address included in the bidirectional forwarding detection packet is not owned by the first switch, determining, at the first switch, that the destination MAC address is owned by the second switch and bridging, from the first switch, the bidirectional forwarding detection packet to the second switch that owns the MAC address.

FIG. 1A is a block diagram of an example system 100 where may be useful. The system 100 may use a MCLAG topology.

The system 100 may include a first switch 104 and a second switch 106 connected by a link 108. The system may also include a first network device 110, a second network device 112 and a third network device 114. These devices may be any number of network devices, as described above. For example, devices 110-114 may be network switches.

A network device may be a device within a network that forwards data sent by a sender device toward a recipient device (or multiple recipient devices). In some examples, a network device includes a layer 2 switch that forwards data packets (also referred to as data frames or data units) based on layer 2 addresses in the data packets. Examples of layer 2 addresses include Medium Access Control (MAC) addresses. In alternative examples, a switch includes a layer 3 router that forwards data packets based on layer 3 addresses, such as Internet Protocol (IP) addresses in the data packets.

A "packet" or "data packet" can refer to any unit of data that can be conveyed over a network. A packet or data packet may also refer to a frame or data frame, a data unit, a protocol data unit, and so forth.

A switch forwards data (in data packets) between a sender device and a recipient device (or multiple recipient devices) based on forwarding information (or equivalently, "routing information") accessible by the switch. The forwarding information can include entries that map network addresses (e.g., MAC addresses or IP addresses) and/or ports to respective network paths toward the recipient device(s).

A switch can include interfaces connected to respective links, where the links can be connected to other switches or to devices (e.g., a sender device that originates data that is transmitted, or a recipient device that is a destination or target of data transmitted over a network).

Interfaces of a switch can also be referred to as "ports." Generally, a port can refer to a hardware transceiver used to transmit and receive data over a corresponding network link, or can refer to a combination of the hardware transceiver and protocol layer(s) that communicate(s) data according to respective communication protocol(s).

The first switch 104 may be communicatively coupled to each of the network devices 110-114. Similarly, the second switch 106 may be communicatively coupled to each of the network devices 110-114. Link 108 and the various connections between the first switch 104, second switch 106 and the network devices 110-114 may be a physical link, such as an Ethernet connection or other physical connection, a wireless connection, a virtual connection, etc.

The combination of the first switch 104 and the second switch 106 may be presented to the user as a single virtualized switch 116. One of the switches may be a primary switch and the other switch may be a peer switch. In the event that the first switch 104 goes down, no traffic may be lost, although the total amount of bandwidth available to the system may be reduced. Moreover, this architecture provides the ability to configure one switch 104 and have the configuration synced to the peer switch 106. This keeps the network facing elements consistent across management changes to allow for load balancing and high availability in case of failure.

Moreover, the virtualization of the first switch 104 and the second switch 106 as a single virtualized switch 116 may allow an LACP (Link Aggregation Control Protocol) group to span more than one switch. In MCLAG (Multi Chassis LAG) based virtualized switch deployments there are two independent control planes. If the MCLAG pair is connected-up to the core switch(s) via an MCLAG with any routing protocol running on top, the switches may sync their Router-MAC entries between the devices involved so that data traffic can be directly forwarded without sending over an Inter-Switch Link (ISL).

To work properly, an MCLAG topology may need to keep address entries (such as router-MAC entries) in sync between the first switch 104 and the second switch 106. This means that if a packet is received at the first switch 104 with the address of the second switch 106, the first switch 104 need not bridge it to the second switch 106 to forward the packet to uplink/downlink. Accordingly, the address of the first switch 104 and the second switch 106 may be synchronized between each other in typical MCLAG solutions. Along with this, MCLAG implementations may make sure that the control plane protocols can run independently— which means a routing protocol like OSPF can run between each of the devices in the system 100 (i.e. first device 110 to first switch 104, first device 110 to second switch 106, first switch 104 to second switch 106, etc.) and exchange routing information between the different devices.

Bidirectional Forwarding Detection (BFD) is a detection protocol used to provide fast forwarding path failure detection times for media types, encapsulations, topologies, and routing protocols. BFD can be used to detect forwarding path failures at a uniform rate, rather than the variable rates for different routing protocol hello mechanisms, making network profiling and planning easier and reconvergence time will be consistent and predictable. BFD may use control packets and echo packets to detect link failures.

When BFD (Bidirectional Forwarding Detection) is enabled for routing protocol adjacencies in virtualized switch deployments, BFD echo packets may be sent an address, such as a router-MAC address, of the virtualized switch device, but may get consumed by another device in the virtualized switch pair since the router-MAC address is shared between the 2 switches in the data plane. In such cases, BFD running between the virtualized switch pair of switches may not be able to detect a failure of the BFD-peer device when echo packets are being forwarded by the virtualized switch peer device.

On an MCLAG deployments, BFD is run for link failure detection when routing protocols are run between these devices. When the BFD Echo function is active, a stream of BFD Echo packets is transmitted in such a way as to have the other system loop them back through its forwarding path. If a number of packets of the echoed data stream are not received, the session is declared to be down. The key point is that the BFD echo leverages the fast/hardware forwarding path on the neighbor to get the echo packet returned to itself without waiting for an interrupt and special handling by the CPU. An echo packet is sent with the destination IP address as self IP address and destination Router-MAC address as the Router-MAC address of the peer to which BFD session is established.

Figure 1B:
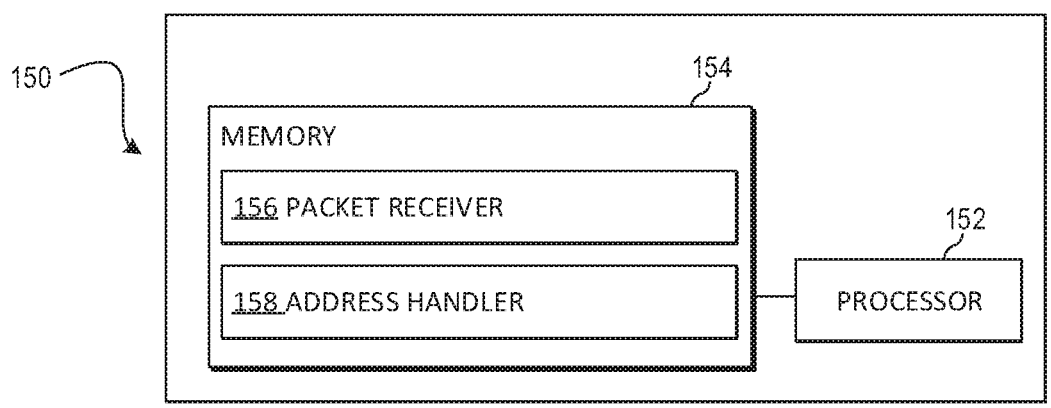
FIG. 1B is a block diagram of another example system for supporting BFD packets in a virtualized switch environment.

FIG. 1B is a block diagram of another example system 150 for supporting BFD packets in a virtualized switch environment. Both the first and second switches may be configured to actively manage a network and/or to appear as a single virtual switch in a management pane System 150 may include a processor 152 and a memory 154 that may be coupled to each other through a communication link (e.g., a bus). Processor 152 may include a single or multiple Central Processing Units (CPU) or another suitable hardware processor(s). In some examples, memory 154 stores machine readable instructions executed by processor 152 for system 150. Memory 154 may include any suitable combination of volatile and/or non-volatile memory, such as combinations of Random Access Memory (RAM), Read-Only Memory (ROM), flash memory, and/or other suitable memory.

Memory 154 stores instructions to be executed by processor 152 including instructions for first monitor 156, second monitor 158, deviation handler 160, alert transmitter 162, and/or other components. According to various implementations, system 150 may be implemented in hardware and/or a combination of hardware and programming that configures hardware. Furthermore, in FIG. 1B and other Figures described herein, different numbers of components or entities than depicted may be used.

Processor 152 may execute packet receiver 156 to receive, at a first switch, a packet including a destination Media Access Control (MAC) address, wherein the first switch and a second switch are part of a virtualized switch and each switch in the virtualized switch has a same Media Access Control (MAC) address.

Processor 152 may execute address handler 158 to determine, at the first switch, whether the destination MAC address included in the packet is owned by the first switch. If it is determined that the first switch is not the owner of the MAC address, processor 152 may execute address handler 158 to determine at the first switch, that the destination MAC address is owned by the second switch and bridge, from the first switch, the packet to the second switch that owns the MAC address.

If it is determined that the first switch is the owner of the MAC address, processor 152 may execute address handler 158 to loop the packet from the first switch to an originating device that transmitted the packet.

In some aspects, processor 152 may execute a TTL handler (not pictured) to to determine to not decrement a TTL value associated with the bidirectional forwarding detection packet when the packet is bridged from the first switch to the second switch that owns the MAC address. Processor 152 may execute the TTL handler to identify, using a TCAM rule, that the bidirectional forwarding packet should be bridged to the second switch without decrementing a TTL value in the bidirectional forwarding detection packet when the packet is bridged from the first switch to the second switch that owns the MAC address.

In some aspects, processor 152 may execute a session creator (not pictured) to create a virtualized switch session between the first switch and the second switch, wherein the second switch is a primary switch and the first switch is a peer switch and synchronize a first MAC address of the second switch with the first switch, such that the first MAC address becomes a MAC address of the first switch. Processor 152 may execute the session creator to transmit an establishing bidirectional forwarding packet from the second switch to the first switch in order to establish a bidirectional forwarding session, determine that the bidirectional forwarding packet is not going to be sent to the owner of the first MAC address, transmit, by the second switch, the establishing bidirectional forwarding packet to the second switch and establish the bidirectional forwarding session between the second switch and the first switch.

Figure 2:
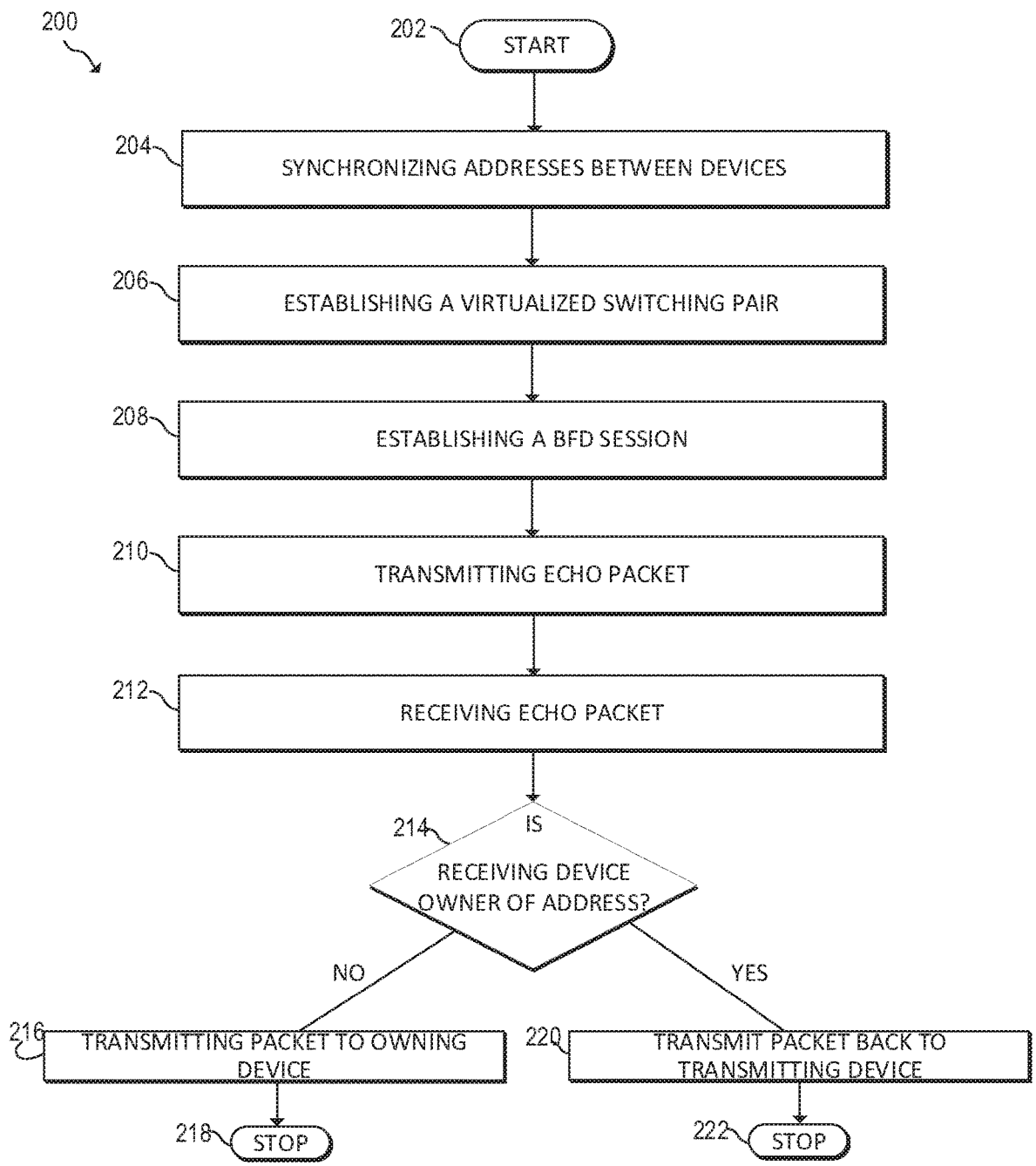
FIG. 2 is a flow diagram of an example method for transmitting BFD packets in a virtualized switch environment.

FIG. 2 is a flow diagram of a method 200 for transmitting BFD packets in a virtualized switch environment. The virtualized switch deployment may have a similar topology to system 100 described above. Accordingly, the method may be performed by one or more of the switches 104-106 and/or devices 110-114 of system 100. Although the description of FIG. 2 may refer to system 100 and other elements of FIG. 1A, this is for illustrative purposes only and the method described in FIG. 2 may be used in a variety of topologies.

In one aspect, a BFD session may be established between first network device 110 and first switch 104. Accordingly, the first network device 110 may send a BFD echo packet on LAG 3 with the destination address set as the address of the first switch 104. Since LAG 3 is a LAG interface, the BFD echo packet may be sent on any of the physical port member of the LAG interface. When a BFD packet is sent from the first network device 110 on the LAG interface, the packet can either reach the first switch 104 or the second switch 106. If the packet reaches the first switch 104, the packet will be correctly forwarded back to the first network device 110 by the first switch 104. But if the packet reaches the second switch 106, the second switch 106 will route the packet back to the first network device 110, and the first network device 110 will determine the state of the first switch 104 based on a BFD echo packet routed back by the second switch 106, even though the first switch 104 might have failed. A similar problem may occur for any device which is part of a virtualized switch pair, if the BFD session is established between the upstream device and other device(s) in the virtualized switch pair.

The method 200 may be used to address the above issue. The method may begin at block 202 and proceed to block 204 where the method may include synchronizing addresses, such as a router-MAC address, between two network devices. The two devices may be similar to the first switch 104 and second switch 106 illustrated above in reference to FIG. 1A. At block 206, the method may include establishing a virtualized switching pair and at block 208, the method may include establishing a BFD session. At block 208, the method may include transmitting an echo packet. For example, an echo packet may be transmitting from a network device, such as the network device 110. At block 212, the method may include receiving the echo packet. The echo packet may be received, for example, at one of the first switch 104 and/or second switch 106.

At block 214, the method may include determining if the receiving device is the owner of the address in the echo packet. If it is determined that the receiving device is not the owner of the address in the echo packet (NO branch of block 214), then at block 216 the method may include transmitting the packet to the owning device. If a BFD Echo packet is received on a virtualized switch pair switch (such as first switch 104 and/or second switch 106), and if the destination Router-MAC address present in the BFD Echo packet is not owned by this switch (even though it is synced to this device), the packet may be forwarded/bridged to the switch that is owning this Router-MAC address. In other words, if a BFD Echo packet with a destination Router-MAC address of the first switch 104 reaches the second switch 106, the second switch 106 will check if the destination address of the packet is owned by the receiving switch. The method may then proceed to block 218, where the method may end. In some aspects, one or more steps of the method 200 may be performed at the owning device switch.

If it is determined that the receiving device is the owner of the address in the echo packet (YES branch of block 214), then at block 220 the method may include transmitting the packet to the transmitting device (such as network device 110). The method may then proceed to block 222, where the method may end. If the destination address of the packet is not owned by the receiving switch, the receiving switch will forward the packet to the owner (i.e. the first switch 104), which in turn will eventually loop it back to the originator (i.e. first network device 110).

In some aspects, BFD deployments may use Time-to-live (TTL) as a security mechanism. Accordingly, received BFD packets that are demultiplexed to the session are be discarded if the received TTL (or Hop Limit) is not equal to a predetermined value, such as 255. In the scenario described above, when the BFD echo packet is transmitted from the second switch to the first switch (who owns the address that is specified in the packet), the TTL should be decremented by 1. This may cause the packet to be invalidated and dropped, leading to a potential end of the BFD Session. Accordingly, when a BFD echo packet is to be forwarded to another device in the same virtual switching pair, the TTL value of this packet should not be decremented. For example, a TCAM rule may be installed in the virtual switch enabled devices to identify a BFD echo packet, and force bridge the BFD echo packet to the device which actually owns the address in the virtualized switch chain while not decrementing the TTL value in the BFD echo packet.

Figure 3:
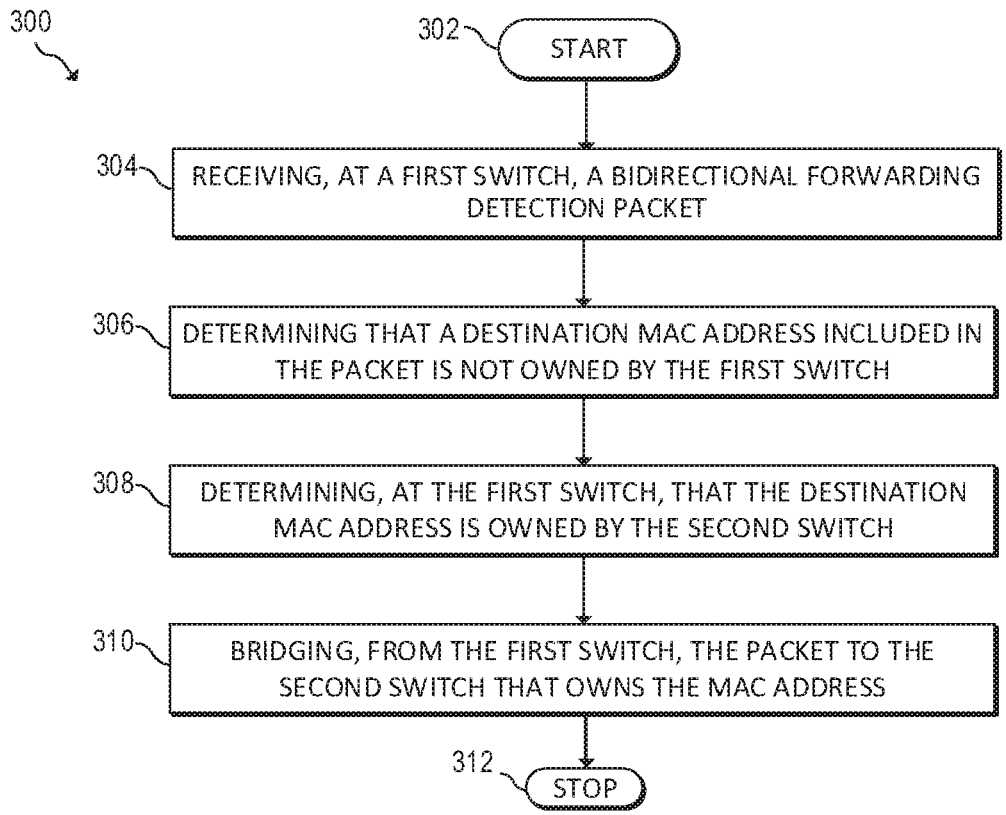
FIG. 3 is a block diagram of another example method for transmitting BFD packets in a virtualized switch environment.

FIG. 3 is a flow diagram of a method 300 for another example method for transmitting BFD packets in a virtualized switch environment. The method may be similar to the method 200 described above in reference to FIG. 2. The virtualized switch deployment may have a similar topology to system 100 described above. Accordingly, the method may be performed by one or more of the switches 104-106 and/or devices 110-114 of system 100. Although the description of FIG. 2 may refer to system 100 and other elements of FIG. 1A, this is for illustrative purposes only and the method described in FIG. 2 may be used in a variety of topologies.

The method may begin at block 302 and may proceed to block 304 where the method may include receiving, at a first switch, a bidirectional forwarding detection packet, wherein the first switch and a second switch are part of a virtualized switch and each switch in the virtualized switch has a same Media Access Control (MAC) address. The first and second switches may be configured to actively manage a network and are configured to appear as a single virtual switch in a management pane. Both the first and second switches may be configured to actively manage a network and are configured to appear as a single virtual switch in a management pane.

In some aspects, a bidirectional forwarding session may be established between the first and second switch. Establishing the session may include transmitting an establishing bidirectional forwarding packet, from the second switch to the first switch in order to establish a bidirectional forwarding session and determining, by the second switch, that the bidirectional forwarding packet is not going to be sent to the owner of the first MAC address. The method may further include transmitting, by the second switch, the establishing bidirectional forwarding packet to the second switch and establishing the bidirectional forwarding session between the second switch and the first switch.

At block 306, the method may include determining, at the first switch, that a destination MAC address included in the bidirectional forwarding detection packet is not owned by the first switch. At block 308, the method may include determining, at the first switch, that the destination MAC address is owned by the second switch. At block 310, the method may include bridging, from the first switch, the bidirectional forwarding detection packet to the second switch that owns the MAC address. In some aspects, the method may also include determining, by the second switch, to not decrement a TTL value associated with the bidirectional forwarding detection packet. The method may also include identifying, using a TCAM rule, that the bidirectional forwarding packet should be bridged to the second without decrementing a TTL value in the bidirectional forwarding detection packet. The method may proceed to block 312, where the method may end.

In some aspects, the method may also include receiving, at the second switch, the bidirectional forwarding detection packet and determining, at the second switch, that the second switch is the owner of the destination MAC address.

Figure 4:
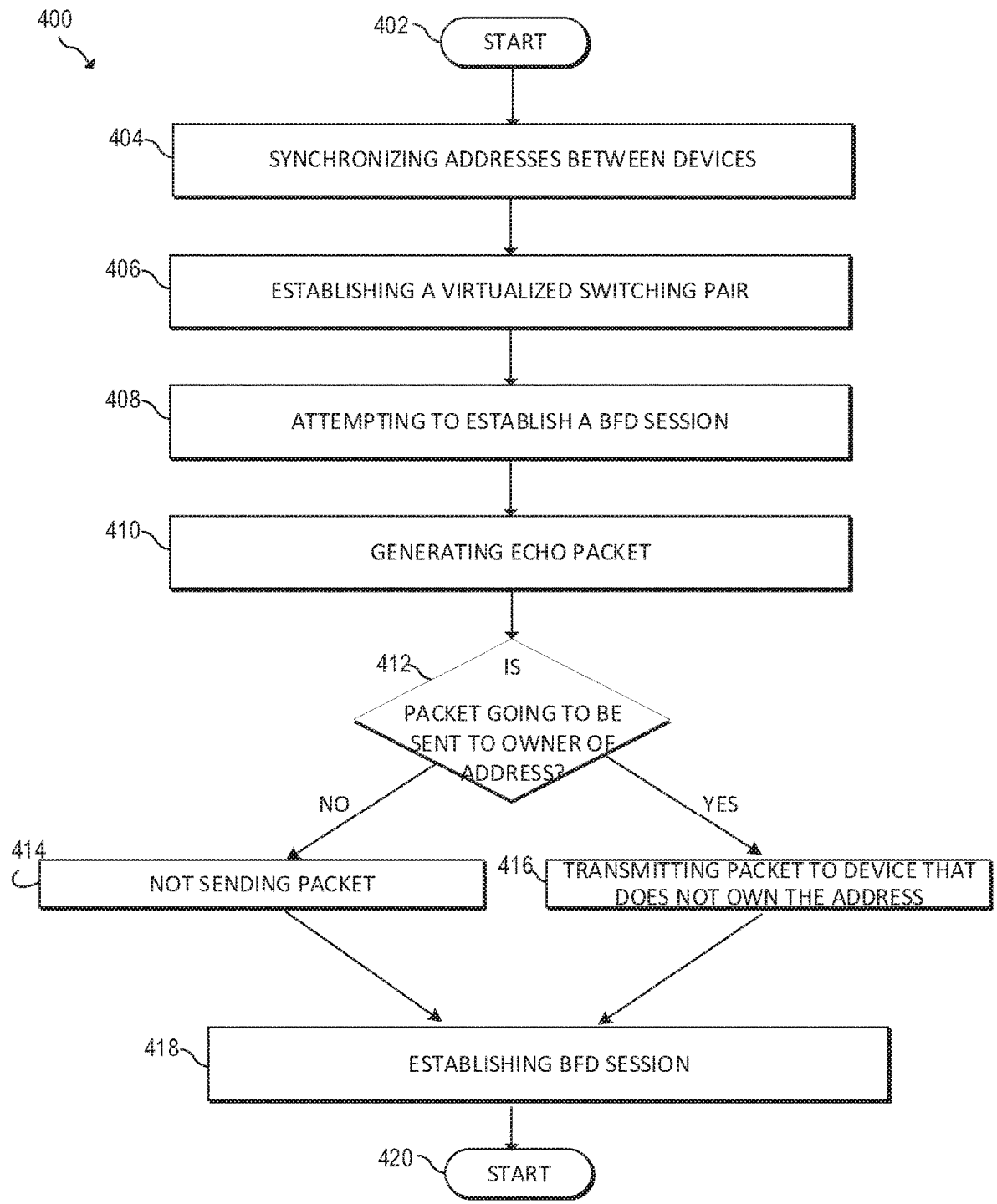
FIG. 4 is a flow diagram of an example method for establishing a BFD session in a virtualized switch environment.

Another potential issue that may arise when trying to support BFD in a virtualized switch deployment is that when establishing a BFD session between two devices (such as between the first switch 104 and the second switch 106 illustrated in FIG. 1), one of the switches (such as a primary switch) may try to send BFD echo packet on the link (such as an inter-switch link (ISL)) with the destination address of another switch in the virtualized switch (such as a peer switch). Since both switches have the same synchronized MAC address, the destination address of the packet will find a match on the list of self MAC addresses preventing the packet from being sent out. This will cause the BFD session to time out, and protocol adjacencies to be broken, FIG. 4 is a flow diagram of a method 400 for establishing a BFD session in a virtualized switch environment. The virtualized switch deployment may have a similar topology to system 100 described above. Accordingly, the method may be performed by one or more of the switches 104-106 and/or devices 110-114 of system 100. Although the description of FIG. 2 may refer to system 100 and other elements of FIG. 1A, this is for illustrative purposes only and the method described in FIG. 2 may be used in a variety of topologies.

The method 400 may be used to address the above issue. The method may begin at block 402 and proceed to block 404, where the method may include synchronizing addresses between devices. For example, router-MAC addresses of two switches, such as first switch 104 and second switch 106 may be synchronized. One of the switches may be a primary switch and one switch may be a peer switch. The address of the primary switch may be synchronized with the peer switch, such that the address of the primary switch becomes the address for both switches in the virtualized switch.

At block 406, the method may include establishing a virtualized switching pair between the devices and at block 408, the method may include attempting to establish a BFD session. The BFD session may be established through the use of an echo packet. Accordingly, at block 410, the method may include generating an echo packet and at block 412, the method may include determining if the destination address in the packet is owned by the transmitting device.

If it is determined that the destination address in the packet is not owned by the transmitting device (NO branch of block 412), at block 414 the method may include transmitting the packet. If it is determined that the destination address in the packet is owned by the transmitting device (YES branch of block 412), at block 416 the method may include not transmitting the packet. In either case, the method may proceed to block 418 where the method may include establishing a BFD session. The method may proceed to block 420, where the method may end.

A BFD echo packet received/to be sent may be identified using a TCAM rule, and if the destination address of the packet to be sent is not "owned" by the device, the packet may be transmitted to the device that owns the address. In this way, BFD session will run between the devices in the virtualized switch pair.

For example, if the address of the primary switch was synchronized to the secondary switch, then the primary switch would be the owner of the address. Accordingly, the primary switch may determine if the packet is set to be sent to itself or the peer switch. If it is to be sent to the peer switch, then the primary switch may proceed with transmitting the packet.

Figure 5:
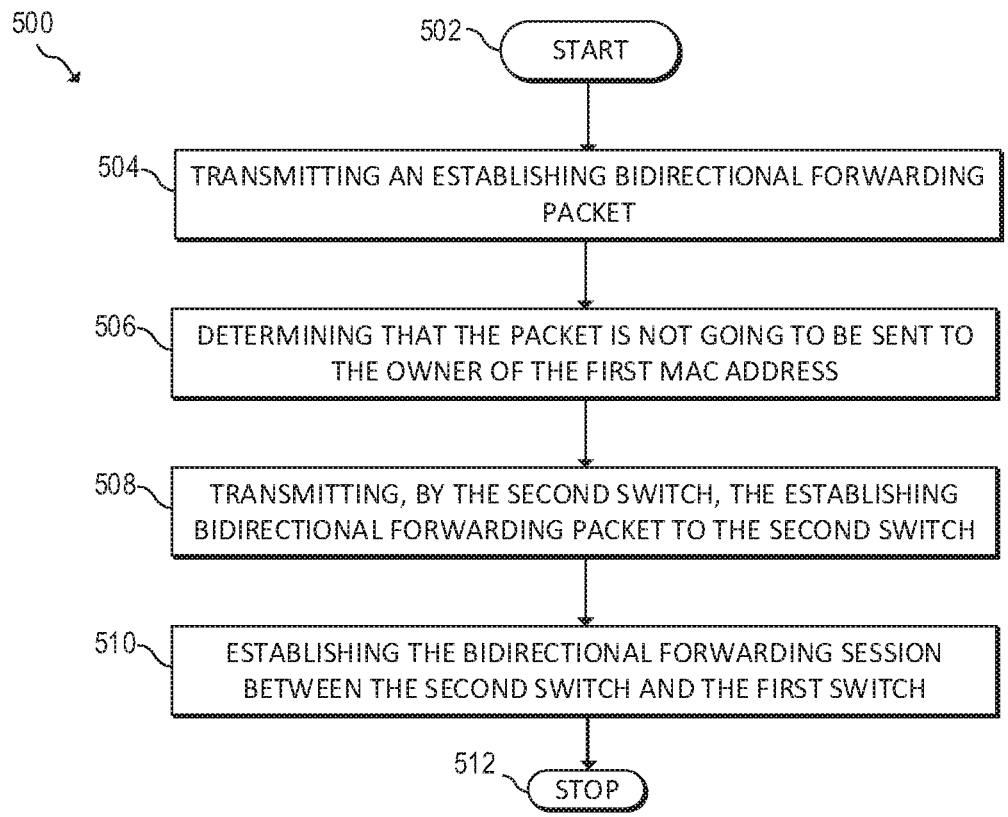
FIG. 5 is a flow diagram of another example method for establishing a BFD session in a virtualized switch environment.

FIG. 5 is a flow diagram of another method 500 for establishing a BFD session in a virtualized switch environment. The virtualized switch deployment may have a similar topology to system 100 described above. Accordingly, the method may be performed by one or more of the switches 104-106 and/or devices 110-114 of system 100. Although the description of FIG. 2 may refer to system 100 and other elements of FIG. 1A, this is for illustrative purposes only and the method described in FIG. 2 may be used in a variety of topologies.

Figure 6:
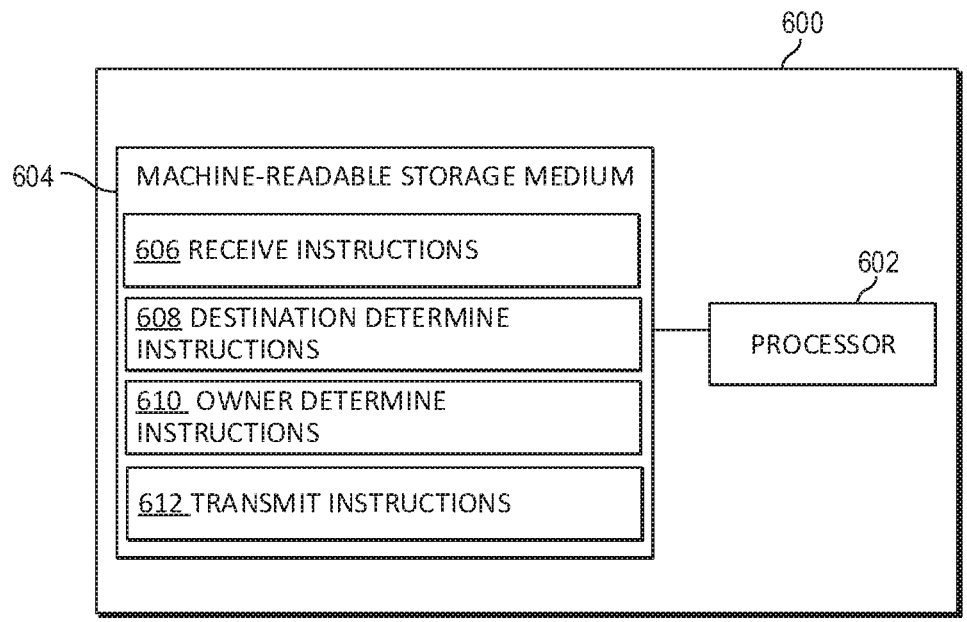
FIG. 6 is a block diagram of an example storage medium storing machine-readable instructions supporting BFD packets in a virtualized switch environment.

The method may begin at block 502 and proceed to block 504, where the method may include transmitting an establishing bidirectional forwarding packet. At block 506, the method may include determining that the packet is not going to be sent to the owner of the first mac address. At block 508 the method may include transmitting, by the second switch, the establishing bidirectional forwarding packet to the second switch and at block 510, the method may include establishing the bidirectional forwarding session between the second switch and the first switch. The method may proceed to block 512, where the method may end, FIG. 6 is a block diagram of an example system 600 for supporting BFD packets in a virtualized switch environment. Both the first and second switches may be configured to actively manage a network and/or to appear as a single virtual switch in a management pane.

In the example illustrated in FIG. 6, system 600 includes a processor 602 and a machine-readable storage medium 604. In some aspects, processor 602 and machine-readable storage medium 604 may be part of an Application-specific integrated circuit (ASIC). Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 602 may be at least one central processing unit (CPU), microprocessor, and/or other hardware devices suitable for retrieval and execution of instructions stored in machine-readable storage medium 604. In the example illustrated in FIG. 6, processor 602 may fetch, decode, and execute instructions 606, 608, 610 and 612. Processor 602 may include at least one electronic circuit comprising a number of electronic components for performing the functionality of at least one of the instructions in machine-readable storage medium 604. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 604 may be any electronic, magnetic, optical, or other physical storage device that stores executable instructions. Thus, machine-readable storage medium 604 may be, for example, Random Access Memory (RAM), an Electrically-Erasable Programmable Read-Only Memory (EEPROM), a storage drive, an optical disc, and the like. Machine-readable storage medium 604 may be disposed within system 600, as shown in FIG. 6. In this situation, the executable instructions may be "installed" on the system 600. Machine-readable storage medium 604 may be a portable, external or remote storage medium, for example, that allows system 600 to download the instructions from the portable/external/remote storage medium. In this situation, the executable instructions may be part of an "installation package". As described herein, machine-readable storage medium 604 may be encoded with executable instructions for context aware data backup. The machine-readable storage medium may be non-transitory.

Referring to FIG. 6, receive instructions 606, when executed by a processor (e.g., 602), may cause system 600 to receive, at a first switch, a bidirectional forwarding detection packet, wherein the first switch is part of a virtualized switch and each switch in the virtualized switch has a same Media Access Control (MAC) address.

Destination determine instructions 608, when executed by a processor (e.g., 602), may cause system 600 to determine, at the first switch, that a destination MAC address included in the bidirectional forwarding detection packet is not owned by the first switch. In some aspects, the processor (e.g., 602) may execute instructions to cause system 600 to create a virtualized switch session between the first switch and the second switch and synchronize a first MAC address of the second switch with the first switch, such that the first MAC address becomes a MAC address of the first switch. In some aspects, the processor (e.g., 602) may execute instructions to cause system 600 to create a BFD session including transmitting an establishing bidirectional forwarding packet, from the second switch to the first switch in order to establish a bidirectional forwarding session, determining, by the second switch, that the bidirectional forwarding packet is not going to be sent to the owner of the first MAC address, transmitting, by the second switch, the establishing bidirectional forwarding packet to the second switch and establishing the bidirectional forwarding session between the second switch and the first switch.

Owner determine instructions 610, when executed by a processor (e.g., 602), may cause system 600 to determine, at the first switch, that the destination MAC address is owned by a second switch, the second switch belonging to the virtualized switch and having the same MAC address as the first switch.

Transmit instructions 612, when executed by a processor (e.g., 602), may cause system 600 to transmit, from the first switch, the bidirectional forwarding detection packet to the second switch that owns the MAC address. Transmit instructions 612, when executed by a processor (e.g., 602), may cause system 600 to determine, by the second switch, to not decrement a TTL value associated with the bidirectional forwarding detection packet and/or identify, using a TCAM rule, that the bidirectional forwarding packet should be transmitted to the second without decrementing a TTL value in the bidirectional forwarding detection packet. In some aspects, the processor (e.g., 602), may execute instructions to cause system 600 to receive, at the second switch, the bidirectional forwarding detection packet and determine, at the second switch, that the second switch is the owner of the destination MAC address.

The foregoing disclosure describes a number of examples for supporting BFD packets in a virtualized switch environment. The disclosed examples may include systems, devices, computer-readable storage media, and methods for supporting BFD packets in a virtualized switch environment. For purposes of explanation, certain examples are described with reference to the components illustrated in FIGS. 1A-6. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1A-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

We claim:

1. A method comprising:
   receiving, at a first switch, a bidirectional forwarding detection packet, wherein the first switch and a second switch are part of a virtualized switch and each switch in the virtualized switch has a same Media Access Control (MAC) address;
   determining, at the first switch, that a destination MAC address included in the bidirectional forwarding detection packet is not owned by the first switch;
   determining, at the first switch, that the destination MAC address is owned by the second switch; and
   bridging, from the first switch, the bidirectional forwarding detection packet to the second switch that owns the MAC address;
   creating a virtualized switch session between the first switch and the second switch; and
   synchronizing a first MAC address of the second switch with the first switch, such that the first MAC address becomes a MAC address of the first switch by:
      transmitting an establishing bidirectional forwarding packet, from the second switch to the first switch in order to establish a bidirectional forwarding session;
      determining, by the second switch, that the bidirectional forwarding packet is not going to be sent to the owner of the first MAC address;
      transmitting, by the second switch, the establishing bidirectional forwarding packet to the second switch; and
      establishing the bidirectional forwarding session between the second switch and the first switch.

2. The method of claim 1 comprising:
receiving, at the second switch, the bidirectional forwarding detection packet; and
determining, at the second switch, that the second switch is the owner of the destination MAC address.

3. The method of claim 1 comprising:
determining, by the second switch, to not decrement a Time-to-live (TTL) value associated with the bidirectional forwarding detection packet.

4. The method of claim 1 comprising:
identifying, using a ternary content-addressable memory (TCAM) rule, that the bidirectional forwarding packet should be bridged to the second without decrementing a TTL value in the bidirectional forwarding detection packet.

5. The method of claim 1, wherein both the first and second switches are configured to actively manage a network and are configured to appear as a single virtual switch in a management pane.

6. A system comprising:
a packet receiver to receive, at a first switch, a packet including a destination Media Access Control (MAC) address, wherein the first switch and a second switch are part of a virtualized switch and each switch in the virtualized switch has a same Media Access Control (MAC) address;
an address handler to:
   determine, at the first switch, whether the destination MAC address included in the packet is owned by the first switch;
wherein, if it is determined that the first switch is not the owner of the MAC address:
   determine at the first switch, that the destination MAC address is owned by the second switch;
   bridge, from the first switch, the packet to the second switch that owns the MAC address;
wherein, if it is determined that the first switch is the owner of the MAC address:
   loop the packet from the first switch to an originating device that transmitted the packet; and
a session creator to:
   create a virtualized switch session between the first switch and the second switch, wherein the second switch is a primary switch and the first switch is a peer switch; and
   synchronize a first MAC address of the second switch with the first switch, such that the first MAC address becomes a MAC address of the first switch, the session creator executed to:
      transmit an establishing bidirectional forwarding packet from the second switch to the first switch in order to establish a bidirectional forwarding session;
      determine that the bidirectional forwarding packet is not going to be sent to the owner of the first MAC address;
      transmit, by the second switch, the establishing bidirectional forwarding packet to the second switch; and
      establish the bidirectional forwarding session between the second switch and the first switch.

7. The system of claim 6 comprising:
a Time-to-live (TTL) handler to determine to not decrement a TTL value associated with the bidirectional forwarding detection packet when the packet is bridged from the first switch to the second switch that owns the MAC address.

8. The system of claim 6 comprising:
a TTL handler to identify, using a ternary content-addressable memory (TCAM) rule, that the bidirectional forwarding packet should be bridged to the second switch without decrementing a TTL value in the bidirectional forwarding detection packet when the packet is bridged from the first switch to the second switch that owns the MAC address.

9. The system of claim 6, wherein both the first and second switches are configured to
actively manage a network and are configured to appear as a single virtual switch in a management pane.

10. A non-transitory computer-readable storage medium encoded with instructions, the
instructions executable by a processor of a system to cause the system to:
receive, at a first switch, a bidirectional forwarding detection packet, wherein the first switch is part of a virtualized switch and each switch in the virtualized switch has a same Media Access Control (MAC) address;
determine, at the first switch, that a destination MAC address included in the bidirectional forwarding detection packet is not owned by the first switch;
determine, at the first switch, that the destination MAC address is owned by a second
switch, the second switch belonging to the virtualized switch and having the same MAC address as the first switch;
transmit, from the first switch, the bidirectional forwarding detection packet to the second switch that owns the MAC address;
create a virtualized switch session between the first switch and the second switch; and
synchronize a first MAC address of the second switch with the first switch, such that the first MAC address becomes a MAC address of the first switch;
transmit an establishing bidirectional forwarding packet, from the second switch to the first switch in order to establish a bidirectional forwarding session;
determine, by the second switch, that the bidirectional forwarding packet is not going to be sent to the owner of the first MAC address;
transmit, by the second switch, the establishing bidirectional forwarding packet to the second switch; and
establish the bidirectional forwarding session between the second switch and the first switch.

11. The non-transitory computer-readable storage medium of claim 10, the instructions
executable by a processor of a system to cause the system to:
receive, at the second switch, the bidirectional forwarding detection packet; and
determine, at the second switch, that the second switch is the owner of the destination MAC address.

12. The non-transitory computer-readable storage medium of claim 10, the instructions
executable by a processor of a system to cause the system to:
determine, by the second switch, to not decrement a Time-to-live (TTL) value associated with the bidirectional forwarding detection packet.

13. The non-transitory computer-readable storage medium of claim 10, the instructions
executable by a processor of a system to cause the system to:
identify, using a ternary content-addressable memory (TCAM) rule, that the bidirectional forwarding packet should be transmitted to the second without decrementing a TTL value in the bidirectional forwarding detection packet.

14. The non-transitory computer-readable storage medium of claim 10, wherein both the first and second switches are configured to actively manage a network and are configured to appear as a single virtual switch in a management pane.

\* \* \* \* \*